US011780600B2

(12) United States Patent
Forte et al.

(10) Patent No.: US 11,780,600 B2
(45) Date of Patent: Oct. 10, 2023

(54) SYSTEM AND METHOD FOR COMBINED PROPELLER SPEED AND PROPELLER PITCH CONTROL FOR A TURBOPROPELLER ENGINE

(71) Applicant: GE Avio S.r.l., Rivalta di Torino (IT)

(72) Inventors: Pierpaolo Forte, Rivalta di Torino (IT); Stefano Ettorre, Bari (IT); Giuseppe Donini, Rivalta di Torino (IT)

(73) Assignee: GE Avio S.r.l., Rivalta di Torino (IT)

( * ) Notice: Subject to any disclaimer, the term of this patent is extended or adjusted under 35 U.S.C. 154(b) by 475 days.

(21) Appl. No.: 16/982,334

(22) PCT Filed: Mar. 22, 2019

(86) PCT No.: PCT/EP2019/057329
§ 371 (c)(1),
(2) Date: Sep. 18, 2020

(87) PCT Pub. No.: WO2019/180250
PCT Pub. Date: Sep. 26, 2019

(65) Prior Publication Data
US 2021/0009278 A1    Jan. 14, 2021

(30) Foreign Application Priority Data
Mar. 23, 2018   (EP) .................................... 18425017

(51) Int. Cl.
*B64D 31/06*    (2006.01)
*B64C 11/30*    (2006.01)
(Continued)

(52) U.S. Cl.
CPC ............ *B64D 31/06* (2013.01); *B64C 11/301* (2013.01); *B64C 11/305* (2013.01); *B64C 11/44* (2013.01); *F02C 9/58* (2013.01)

(58) Field of Classification Search
CPC ........ F02C 9/58; B64C 11/301; B64C 11/305; B64C 11/34; B64C 11/44; B64D 2027/005; B64D 31/06
See application file for complete search history.

(56) References Cited

U.S. PATENT DOCUMENTS 2,631,677 A * 3/1953 Kochenburger .......... F02C 9/58
 374/144
2,667,228 A * 1/1954 Wood ........................ F02C 9/58
 416/36

(Continued)

FOREIGN PATENT DOCUMENTS

| EP | 3002436 A1 | 4/2016 |
|---|---|---|
| WO | WO2014/083259 A1 | 6/2014 |

OTHER PUBLICATIONS

PCT International Search Report Corresponding to PCT/EP2019/057329 dated May 8, 2019.

*Primary Examiner* — Jason H Duger
(74) *Attorney, Agent, or Firm* — Dority & Manning, P.A.

(57) ABSTRACT

An electronic control system (30) for a turbopropeller engine (12) having a gas turbine (20) and a propeller assembly (13) coupled to the gas turbine (20), controls propeller operation based on a pilot input request, via generation of a driving quantity (Ip) for an actuation assembly (29) designed to adjust a pitch angle ($\beta$) of propeller blades (2) of the propeller assembly (13). The control system (30) envisages: a propeller speed regulator (39), receiving at its input a propeller speed error (ep), indicative of a difference between a propeller speed measure (Nr) and a propeller speed demand (Nrref), and generating at its output, based on the propeller speed error (ep), a first control quantity (Outi); a propeller pitch regulator (42), receiving at its input a propeller pitch error (ep), indicative of a difference between a propeller pitch demand ( ) and a pitch position measure ($\beta$), (Continued)

and generating at its output, based on the propeller pitch error (ep), a first control quantity (Out2); and a priority selection stage (45), configured to implement a priority selection between the first and the second control quantities, for providing at the output the driving quantity (IP), based on the priority selection between the first and the second control quantities.

16 Claims, 3 Drawing Sheets

(51) Int. Cl.
  *F02C 9/58* (2006.01)
  *B64C 11/44* (2006.01)

(56) References Cited

U.S. PATENT DOCUMENTS

| | | | |
|---|---|---|---|
| 4,928,241 A * | 5/1990 | Day | B64C 11/48 416/34 |
| 4,934,825 A * | 6/1990 | Martin | B64D 31/12 416/34 |
| 4,958,289 A * | 9/1990 | Sum | B64C 11/305 701/99 |
| 5,023,793 A * | 6/1991 | Schneider | G05D 1/063 290/44 |
| 2011/0208400 A1 | 8/2011 | Lickfold et al. | |
| 2015/0314853 A1 | 11/2015 | Tantot et al. | |
| 2016/0159461 A1 | 6/2016 | Lu et al. | |

* cited by examiner

SYSTEM AND METHOD FOR COMBINED PROPELLER SPEED AND PROPELLER PITCH CONTROL FOR A TURBOPROPELLER ENGINE

CROSS-REFERENCE TO RELATED APPLICATIONS

This patent application claims priority from European patent application no. 18425017.3 filed on Mar. 23, 2018, the entire disclosure of which is incorporated herein by reference.

TECHNICAL FIELD

The present solution relates to a system and method for combined propeller speed and propeller pitch control for a turbopropeller (or turboprop) engine of an aircraft.

BACKGROUND ART

As it is known, a turbopropeller engine includes a gas turbine and a propeller assembly, coupled to the gas turbine via a gearbox assembly.

Aircraft solutions are known, in which a single input device (a power, or throttle, lever) is used by the pilot to input an engine power (torque or thrust) requirement; the same power lever is also used to determine propeller speed or pitch control requirements.

Propeller control implemented by an electronic control system, e.g. a full authority digital engine controller (FADEC), is generally based on a closed-loop tracking of propeller speed and propeller pitch references, taking into account operating and environmental conditions and the power requirement determined by the position of the power lever. The output of the control action is generally a driving quantity, e.g. an electric current, that is supplied to a propeller actuation assembly of the turbopropeller engine (e.g. to a servo-valve) to control the variable pitch of propeller blades.

The variable pitch, in a propeller system, refers to turning the angle of attack of the propeller blades into or out of the wind, to control the production or absorption of power (modulating the thrust). Depending on the angle of attack, the thrust can be generated in a forwards direction (at start, takeoff and flight conditions) or a backwards direction (to reverse the thrust and braking after landing, or during maneuvers on the ground).

FIG. 1 schematically shows the positions that an aircraft power lever, denoted with 1, can assume and the corresponding pitch positions of an exemplary propeller blade 2.

The pitch may be defined as the angle β between a chord 3 extending between leading and trailing edges 3a, 3b of the propeller blade 2 and a direction R about which the propeller blade 2 is rotatable.

In particular, the power lever possible positions are divided into a first range, denoted as "Alpha range" (with a corresponding Alpha mode of operation), and into a second range, distinct from the first range, denoted as "Beta range" (with a corresponding Beta mode of operation).

Alpha range, in a turboprop engine, is the range of power lever positions between idle and maximum take-off (corresponding to a maximum forward request); the Alpha mode is the only operating mode allowed during flight. The Alpha range is used for flight operations and for ground operation when the power lever position is at, or above, idle.

In the Alpha range, the power lever positions always determine a positive or forward thrust, with the pitch angle going from a minimum idle position up to a maximum, or feather, position (e.g. with a pitch angle β equal to 89°. As shown in FIG. 1, the feather position provides zero thrust with minimum air resistance and it is used if the engine is shut down in flight or the propeller overcomes an overspeed threshold.

When in Alpha mode, the power lever 1 sets the propeller speed demand for the electronic control system, which will supply the electric current to the propeller actuation assembly until a propeller speed measure reaches the propeller speed demand. This propeller speed demand is a function of the power lever angular position, according to a predetermined schedule being developed to operate the propeller as close as possible to an optimal operating point, assuming a typical aircraft mission.

Beta range, in the turboprop engine, is the range of power lever positions between idle and maximum reverse; it is allowed only when the aircraft is on the ground. In particular, the Beta range is used for ground operations, including slowing the aircraft after landing.

When starting the turboprop engine and in idle condition, the pitch will assume a positive value (producing a positive or forward thrust) from the idle position until a ground fine position (with zero pitch angle β, corresponding to zero thrust and maximum air resistance); also this range of positions is considered to be part of the Beta range and used only on the ground.

By moving the power lever 1 from the idle position towards maximum reverse, the propeller blades go into reverse pitch, directing the airflow forward from the propeller; this assists in reducing the aircraft speed during the landing roll and also allows for intentionally moving the aircraft backwards.

When in Beta mode (i.e. below idle), the power lever position indicates the pitch angle demand for the electronic control system, which will supply the electric current to the propeller actuation assembly until a pitch angle measure reaches the pitch angle demand.

As discussed above, when in alpha mode, the electronic control system drives the pitch actuator assembly to reach the propeller speed demand. If the actual propeller speed is not able to reach the speed demand, because the power produced by the engine is not sufficient, the control system would move the pitch below the idle position, since the alpha mode does not control the position of the blade pitch; if occurring during the flight, this can be very hazardous.

To avoid this condition, the propeller actuation assembly is provided with a safety passive device called "hydraulic lock", the aim of which is to limit the propeller pitch to a minimum idle position, so called "Min Flight Pitch (MFP)", during flight operations. Regardless of how the pitch is commanded by the propeller control system, if the hydraulic lock is engaged, the pitch will never fall below the MFP value.

Running the propeller with pitch below the MFP during takeoff or flight operations is indeed classified as hazardous/catastrophic, since it could cause propeller overspeed and excessive drag, leading to inability to control the aircraft (this being particularly true in case of twin engine applications).

In most of the known turbopropeller engines, only a single engine idle setting is available, with minimum propeller pitch at the MFP value, both during flight operating conditions and during ground operations, such as taxiing and holding.

However, the MFP idle setting generally delivers more thrust than what would be required during the ground operations, thereby increasing brake usage and fuel consumption and entailing a high pilot workload.

In general, ground operations at idle like taxiing and holding would be optimized from the pilot workload and efficiency standpoint, if the propeller were able to operate below the MFP setting.

In order to address this issue, European patent application 17425083.7 filed on Jul. 28, 2017 in the name of the present Applicant, discloses a propeller control system wherein, during ground operations, the propeller pitch may be limited via the control action to a "Min Ground Pitch (MGP)" value, that is lower than the MFP value, with the hydraulic lock being disengaged. In particular, the MGP or the MFP values are selected, depending on the flight or ground operating conditions, as determined via suitable sensors, e.g. a WoW (Weight on Wheels) sensor.

The solution disclosed in the above patent application advantageously allows to improve ground operation of the aircraft, mitigate operation of the propeller in an avoid band, improve fuel consumption and generally improve operation of the aircraft and turbopropeller engine.

However, the above patent application does not disclose in detail how the electronic control system is able to manage the MGP and MFP values in the propeller speed and propeller pitch control.

Moreover, the present Applicant has realized that known control solutions are not fully satisfactory in controlling the two different operating modes, the Alpha and Beta modes, and in particular the transitions from the same two operating modes.

In particular, a known control solution envisages two distinct control loops, one for controlling the propeller speed based on the propeller speed demand, and the other for controlling the propeller pitch angle based on the pitch angle demand; the outputs of the two control loops are alternatively selected by a control selection switch, based on the Alpha or Beta modes of operation. This control solution has the drawback of requiring complex alignment algorithms to align the two control loops in order to have a smooth and "bumpless" transition between the two operating modes.

Another known control solution envisages cascading two different control loops, one for controlling the propeller speed based on the propeller speed demand, and the other for controlling the propeller pitch based on the pitch angle demand. The drawback of this further solution is that the control action can operate only if the pitch angle sensor, providing the measure of the pitch angle is always available and operational. If, during flight operation, there is a fault on the pitch angle sensor, the electronic control system cannot operate.

DISCLOSURE OF INVENTION

The aim of the present solution is to provide an improved control solution for a turbopropeller engine, allowing to solve the above drawbacks of known control solutions.

According to the present solution, a control system and a control method are therefore provided, as defined in the appended claims.

BRIEF DESCRIPTION OF THE DRAWINGS

For a better understanding of the present invention, preferred embodiments thereof are now described, purely as non-limiting examples, with reference to the attached drawings, wherein.

BEST MODE FOR CARRYING OUT THE INVENTION

Figure 2:
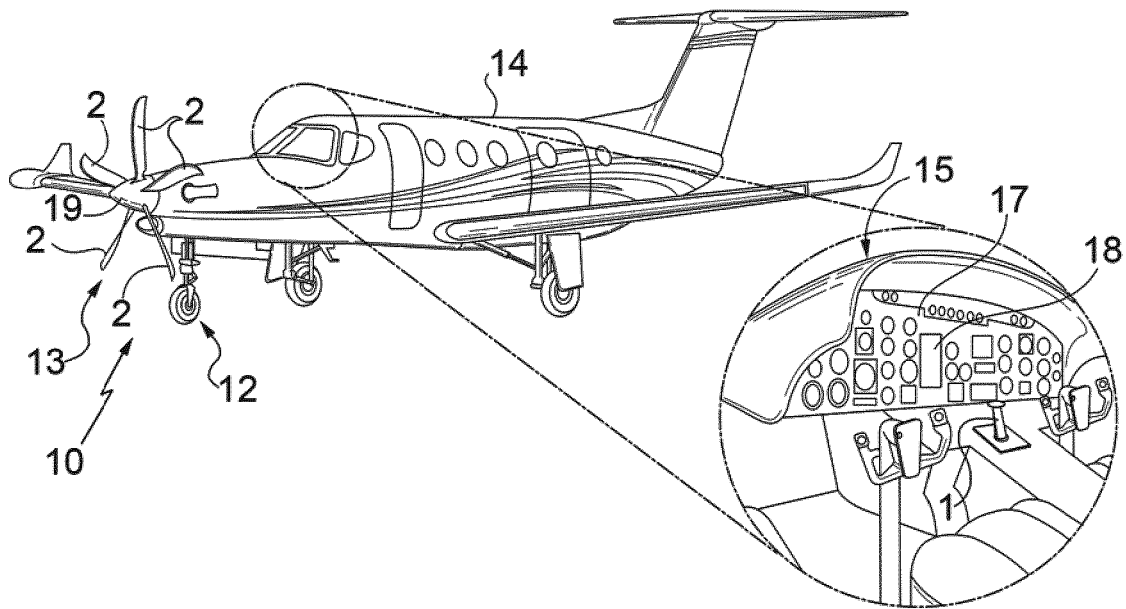
FIG. 2 is a perspective view of an aircraft provided with a turbopropeller engine.

FIG. 2 shows a perspective view of an exemplary aircraft 10, provided with a turbopropeller engine 12; only a propeller assembly 13 of the turbopropeller engine 12 is visible in the same FIG. 2.

Figure 1:
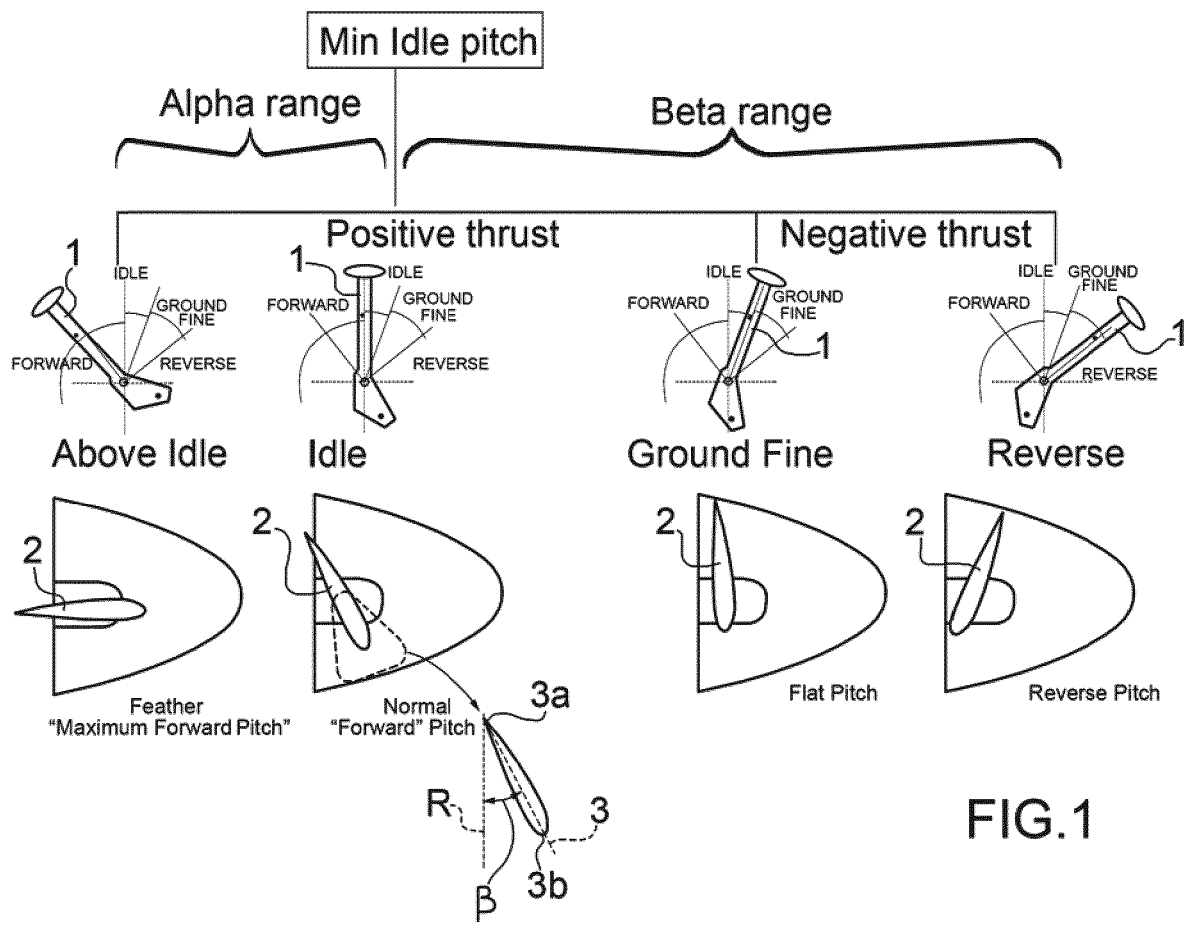
FIG. 1 is a schematic representation of ranges of angular positions of an input power lever determining engine power requirements and of corresponding blade pitch positions.

The aircraft 10 includes an airframe 14 defining a cockpit 15; a single operator-manipulated input device (a power, or throttle, lever), again denoted with 1, and an instrument control panel 17 having a display 18 are provided within the cockpit 15. The operating ranges defined by the power lever 1 substantially correspond to those discussed above, with reference to FIG. 1.

The propeller assembly 13 comprises a hub 19 and a plurality of blades, again denoted with 2, extending outwardly from the hub 19. A gas turbine of the turbopropeller engine 12 (here not shown) generates and transmits power to drive rotation of propeller assembly 13, thus generating thrust for the aircraft 10.

Figure 3:
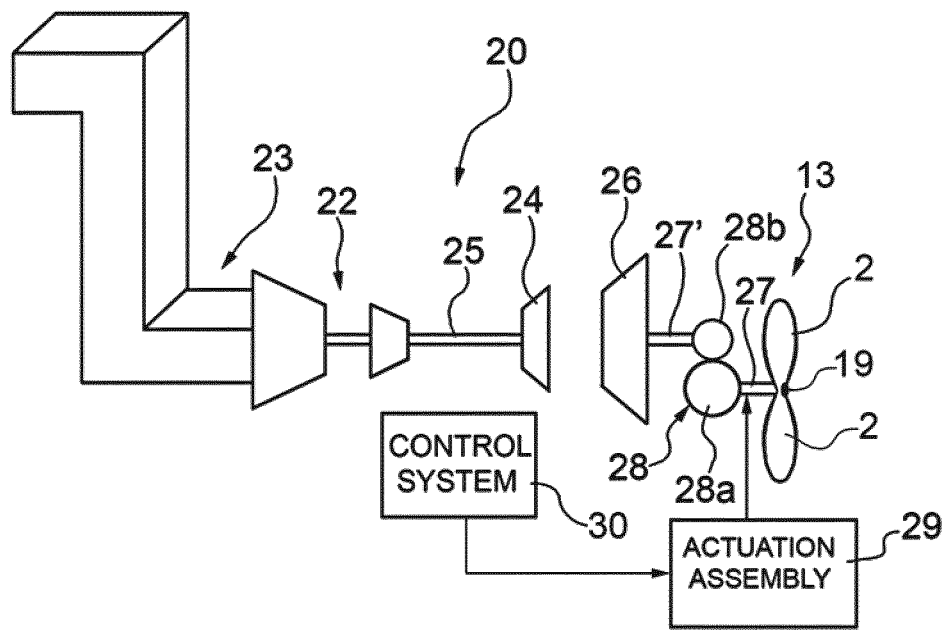
FIG. 3 is a schematic block diagram of the turbopropeller engine of the aircraft.

As schematically shown in FIG. 3, the gas turbine of the turbopropeller engine 12, here denoted with 20, generally comprises:

axial/centrifugal compressors 22, coupled to an air intake 23;

a high-pressure turbine 24, so called "gas generator", coupled to the axial/centrifugal compressors 22 via a gas generator shaft 25; and a low-pressure turbine 26, so called "power turbine", mechanically decoupled from the gas generator shaft 25 and driven by hot gas expansion.

The propeller assembly 13 is coupled to the gas turbine engine 20 via a propeller shaft 27 and a gearbox 28.

More specifically, the gearbox 28 can include a first gear 28a and a second gear 28b in mesh with the first gear 28a. The first gear 28a can be connected to the propeller shaft 27, in turn coupled to the hub 19 of the propeller assembly 13, and the second gear 28b can be connected to a power turbine shaft 27', in turn coupled to the low-pressure turbine 26. During operation, the gearbox 28 can step-down a rotational speed of the power turbine shaft 27', so that a rotational speed of the propeller shaft 27 can be less than the rotational speed of the power turbine shaft 27'.

An actuation assembly 29 is coupled to the propeller assembly 13, to determine the value of the variable pitch angle β of the propeller blades 2.

The turbopropeller engine 12 is managed by an electronic control system 30 (shown schematically in FIG. 3), that includes an electronic processing unit (e.g. a microprocessor, a microcontroller, or similar processing unit) provided with a non-volatile memory storing suitable software instructions, in order to implement an engine control strategy to meet input power requirements, originated from the operator-manipulated power lever 1. The electronic control system 30 may define one or more of a full authority digital engine controller (FADEC), an engine control unit (ECU), an electronic engine control (EEC), a propeller electronic control unit (PEC), and is configured to provide, as discussed below, a driving quantity for the actuation assembly 29, to adjust the variable pitch angle β of the propeller blades 2.

As will be discussed in more details in the following, according to a particular aspect of the present solution, the electronic control system 30 provides a combined control solution, to control both propeller speed and propeller pitch at the same time, also allowing to limit the minimum pitch value at a desired MGP value, lower than the MFP value, during certain operating conditions.

Figure 4:
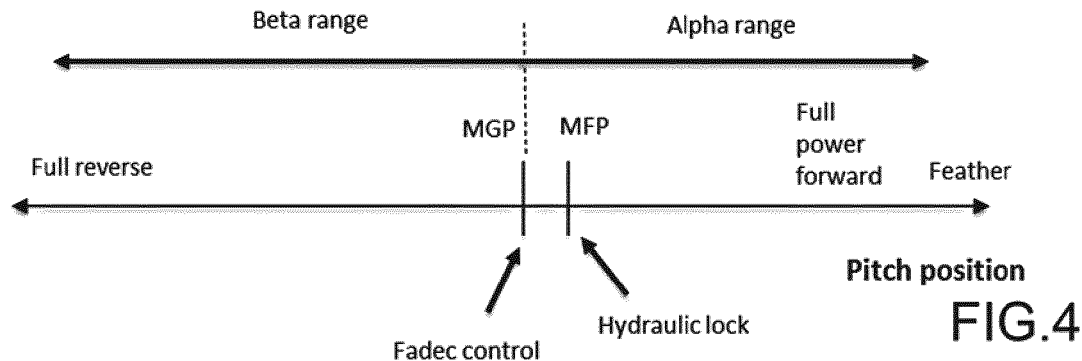
FIG. 4 is a schematic plot of propeller Alpha and Beta operating modes.

As shown in FIG. 4, the MGP value defines in this case the transition from the Beta range and the Alpha range, and represents the value of the minimum pitch during engine starting and at ground idle. The MFP value, higher than the MGP value, is still set by the hydraulic lock, and represents the value of the minimum pitch during flight operations.

Figure 5:
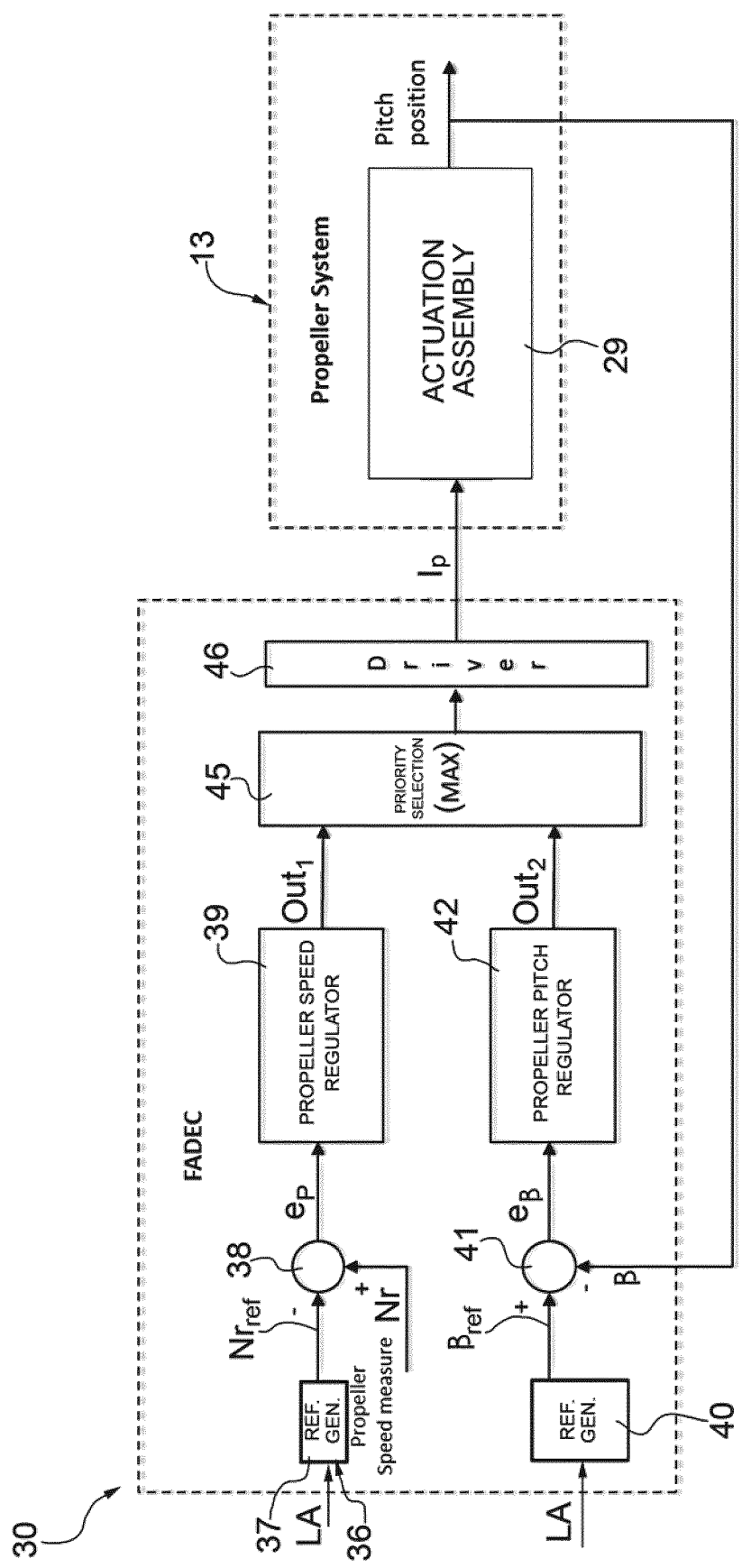
FIG. 5 is a schematic block diagram of a control system of the turbopropeller engine, according to an embodiment of the present disclosure.

With reference to FIG. 5, implementation of the electronic control system 30 of the turbopropeller engine 12 according to an embodiment of the present solution is now discussed in more details.

Electronic control system 30 comprises:

a first reference generator 36, including a first scheduler 37 configured to receive a lever angle signal LA indicative of the positioning angle of the operator-manipulated power lever 1, and to determine a value of a propeller speed demand $Nr_{ref}$ corresponding to the positioning angle of the power lever 1, according to a preset schedule that characterizes turbopropeller engine operation (e.g. provided by the manufacturer and stored in a non-volatile memory of the processing unit of the electronic control system 30);

a first adder block 38, receiving at a first (negative, or subtraction) input the propeller speed demand $Nr_{ref}$ and at a second (positive, or summation) input a measure of the propeller speed Nr, measured by a suitable sensor coupled to the turbopropeller engine 12 (in a possible embodiment, the measure of the propeller speed Nr corresponds to the rotational speed of the power turbine shaft 27'), and providing at the output a propeller speed error $e_p$, as a function of the subtraction between the propeller speed measure Nr and the propeller speed demand $Nr_{ref}$; and a propeller speed regulator 39, receiving at its input the propeller speed error $e_p$ and generating at its output, based on a regulation scheme aimed at minimizing the same propeller speed error $e_p$, a first output quantity $Out_1$, e.g. an electric current.

Electronic control system 30 moreover comprises:

a second reference generator 40, configured to receive the signal LA which is also indicative of the input power requirement and to determine a value of a propeller pitch demand $\beta_{ref}$;

a second adder block 41, receiving at a first (positive, or summation) input the propeller pitch demand $\beta_{ref}$ and at a second (negative, or subtraction) input a pitch position measure β, i.e. the pitch angle measured by a suitable angular sensor coupled to the turbopropeller engine 12, and providing at the output a propeller pitch error $e_\beta$, as a function of the subtraction between the propeller pitch demand $\beta_{ref}$ and the pitch position measure β; and a propeller pitch regulator 42, receiving at its input the propeller pitch error $e_\beta$ and generating at its output, based on a regulation scheme aimed at minimizing the same propeller pitch error $e_\beta$, a second output quantity $Out_2$, e.g. an electric current.

The electronic control system 30 moreover comprises a priority selection stage 45, coupled to the output of the propeller speed regulator 39 and the propeller pitch regulator 42 to receive the first and second output quantities $Out_1$, $Out_2$, and configured to implement a priority selection scheme to provide at the output, based on the first or second output quantities $Out_1$, $Out_2$ and via an actuation driver 46, an actuator driving quantity $I_p$, e.g. an electric current, that is to be supplied to the actuation assembly 29 of the turbopropeller engine 12 (in particular to an integral servo-valve of the same actuation assembly 29), to control the pitch angle β of the propeller blades 2.

In the discussed embodiment, the priority selection stage 45 implements a maximum (max) selection between the first and second output quantities $Out_1$, $Out_2$, providing to the actuation driver 46, for generation of the actuator driving quantity $I_p$, the greater between the same first and second output quantities $Out_1$, $Out_2$. In this case, a positive actuator driving quantity $I_p$ determines an increase of the pitch angle β, when provided to the actuation assembly 29.

Figure 6:
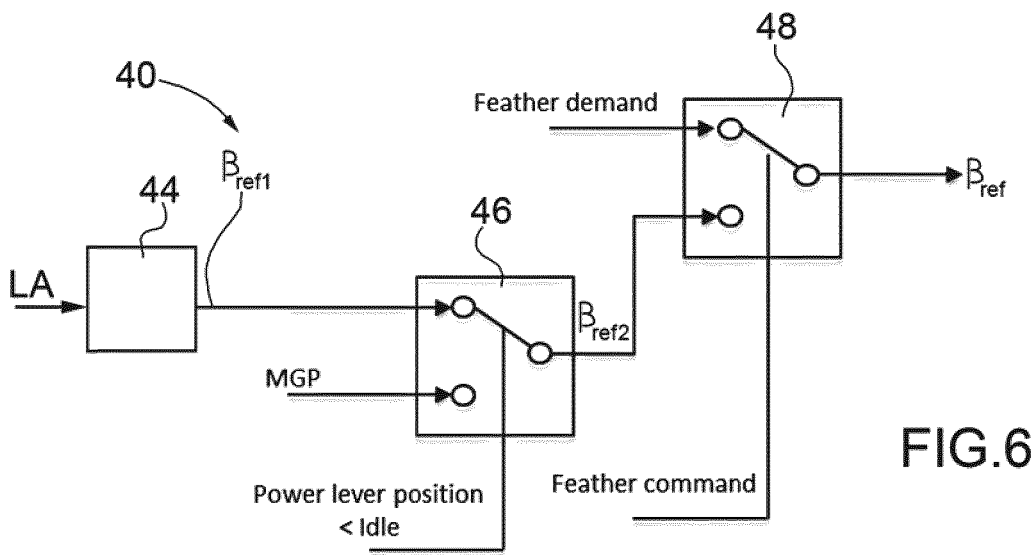
FIG. 6 is a schematic block diagram of a pitch reference generator in the control system of FIG. 5.

A possible embodiment of the second reference generator 40, providing the propeller pitch demand $\beta_{ref}$, is now discussed in more detail and with reference to FIG. 6.

The second reference generator 40 comprises:

a second scheduler 44 configured to receive the signal LA indicative of the position of the power lever 1 and to determine a first reference value $\beta_{ref1}$ for the pitch angle β, corresponding to the positioning angle of the same power lever 1;

a first switch selector 46, having a first switching input coupled to the second scheduler 44 and receiving the first reference value $\beta_{ref1}$, and a second switching input receiving the MGP value, and providing at the output either the first reference value $\beta_{ref1}$ or the MGP value, as a second reference value $\beta_{ref2}$, depending on the position of the power lever 1 being lower than the idle (i.e. indicative of the Beta mode of operation) or, respectively, higher than the idle; and a second switch selector 48, having a respective first switching input coupled to the switching output of the first switch selector 46 and receiving the second reference value $\beta_{ref2}$ (thus being equal to the MGP value when the power lever 1 is at the idle position or at higher values) and a second switching input receiving the feather position value, and providing at the output either the second reference value $\beta_{ref2}$ or the feather position value, as the propeller pitch demand $\beta_{ref}$, based on a feather command (indicative of a feathering request, e.g. in case of an engine failure during takeoff or a rejected landing, requesting fast pitch modulation to the feathering position). In particular, when the feather command is indicative of a feathering request, the propeller pitch demand $\beta_{ref}$ corresponds to the feather position value; otherwise, the propeller pitch demand $\beta_{ref}$ corresponds to the second reference value $\beta_{ref2}$.

Operation of the electronic control system 30 and the corresponding priority selection between the first and the second closed-loop controls, respectively for propeller speed and propeller pitch control, is now discussed in more details, with reference to various engine operating conditions.

Engine Starting to Idle

When the turbopropeller engine 12 is switched-off, the propeller pitch is at the feather position (due to the operation of the propeller hydraulic circuit). When the turbopropeller engine 12 is switched-on on the ground and then reaches the idle condition, the propeller speed Nr is lower than the propeller speed demand $Nr_{ref}$, because the engine power is not sufficient to move the power turbine at the nominal speed. In this case, the propeller speed error $e_p$ is negative; the propeller pitch error $e_\beta$ is also negative, because the pitch position measure $\beta$ is higher than the propeller pitch demand $\beta_{ref}$ provided by the second reference generator 40 (being equal to the MGP value).

Therefore, both the first and the second output quantities $Out_1$, $Out_2$ provided by the propeller speed regulator 39 and, respectively, the propeller pitch regulator 42 are negative, causing the actuator driving quantity $I_p$ also to be negative; the pitch will thus vary, decreasing its position from the feather position towards the MGP value.

When the MGP value is reached, the propeller pitch error $e_\beta$ is zero, while the propeller speed error $e_p$ is still negative, since the propeller speed Nr continues to be lower than the propeller speed demand $Nr_{ref}$ (due to the low power condition); the output of the propeller speed regulator 39 (first output quantity $Out_1$) is thus negative.

Accordingly, as desired, the priority selection stage 45, implementing the maximum selection, selects in this situation the output of the propeller pitch regulator 42 (second output quantity $Out_2$) and the control system 30 operates in Beta mode.

Engine Above Idle

When the turbopropeller engine 12 is generating power (e.g. due to a take-off request), the propeller speed Nr increases, progressively reducing the negative propeller speed error $e_p$; when the propeller speed Nr overcomes the propeller speed demand $Nr_{ref}$, the propeller speed error $e_p$ becomes positive, while the propeller pitch error $e_\beta$ is still zero (the pitch position is still at the MGP value). From this moment, the pitch starts to increase its position due to the output of the propeller speed regulator 39 (since the first output quantity $Out_1$ is higher than the second output quantity $Out_2$). At a steady state, the propeller speed error $e_p$ will be zero and the propeller pitch error $e_\beta$ will be negative.

Accordingly, as desired, the priority selection stage 45 selects the output of the propeller speed regulator 39 (first output quantity $Out_1$) and the propeller control operates in Alpha mode.

Engine at Flight Idle (MFP)

In this condition, the minimum pitch position (MFP value) is assured by the hydraulic lock, which is engaged. When the propeller speed Nr overcomes the propeller speed demand $Nr_{ref}$, the propeller control starts to operate as discussed above (Engine above Idle).

Feather Command

In case of a feather command (which can be enabled only if the pitch position is higher than the MGP value), the propeller pitch demand $\beta_{ref}$ provided by the second reference generator 40 will change from the MGP value to the feather position value (i.e. to the maximum pitch position controlled by the electronic control system 30).

In this case, the priority selection stage 45, implementing the maximum selection, assures that the feather position will be reached, since the propeller pitch error $e_\beta$ is positive until the pitch reaches the feather position. During this transient, the propeller speed Nr decreases (due to the increase of the pitch position), so the propeller speed error $e_p$ becomes negative (the propeller speed Nr being lower than the propeller speed demand $Nr_{ref}$).

Reverse Condition

The electronic control system 30 allows the transition from forward to reverse condition only on the ground and if the power is low; in this condition, the position pitch is at the MGP value.

When the power lever 1 is positioned lower than the idle position (for example, at ground fine or at max reverse), the propeller operation is in the Beta mode; accordingly, the value of the propeller pitch demand $\beta_{ref}$ provided by the second reference generator 40 depends on the position of the power lever 1. In this reverse mode, the propeller speed demand $Nr_{ref}$ is forced at a very high value and the propeller speed error $e_p$ is always negative.

Accordingly, as desired, the priority selection stage 45, implementing the maximum selection, selects in this situation the output of the propeller pitch regulator 42 (second output quantity $Out_2$), because the output of the propeller speed regulator 39 (first output quantity $Out_1$) is negative, and the control system 30 operates in Beta mode.

Based on the above, the priority selection stage 45 is thus configured to select the first output quantity $Out_1$ at the output of the propeller speed regulator 39, when the propeller speed error $e_p$ is positive while the propeller pitch error $e_\beta$ is negative. This situation is verified when the propeller speed Nr overcomes the propeller speed demand $Nr_{ref}$ ($e_p=Nr-Nr_{ref}>0$). The positive propeller speed error $e_p$ will generate a pitch position increase, so the propeller pitch error $e_\beta$ will become negative, since the propeller pitch demand $\beta_{ref}$ is constant in Alpha mode ($e_\beta=\beta_{ref}-\beta<0$).

In this condition, the electronic control system 30 automatically adjusts the pitch in order to maintain the propeller speed demand $Nr_{ref}$.

The Beta mode is normally enabled only after a power decrease (usually, in land approach condition the engine is already in idle) and the weight on wheel sensor (or corresponding sensor) declares that the aircraft 10 is on the ground. In this condition, the propeller speed error $e_p$ will be negative, as $Nr<<Nr_{ref}$. This negative error will decrease the pitch position until $\beta_{ref}=\beta$, so that $e_\beta=0$ while $e_p<0$.

From this moment, the priority selection stage 45, implementing the maximum selection, selects the output of the propeller pitch regulator 42 (second output quantity $Out_2$). When the power lever 1 is in a position lower than Idle in ground (reverse mode), the propeller speed error $e_p$ will be ever more negative than the propeller pitch error $e_\beta$ (this condition will be assured forcing the propeller speed demand $Nr_{ref}$ at a maximum possible value); this means that the second output quantity $Out_2$ at the output of the propeller pitch regulator 42 will always be selected in reverse mode. In reverse mode, the propeller speed Nr will increase with the power, but it will be limited by the fuel regulators.

According to a further aspect of the present solution, both the propeller speed regulator 39 and the propeller pitch regulator 42 comprise a respective lead compensator.

The lead compensator may implement a proportional gain K and a traditional lead/lag function, according to the transfer function:

$$K \cdot \frac{1+s \cdot \tau_z}{1+s \cdot \tau_p}$$

wherein $\tau_z>\tau_p$, $\tau_z$ represents the zero and $\tau_p$ the pole of the transfer function.

The lead/lag function improves the frequency response, increasing the bandwidth; the lead action also decreases the overshoot and the oscillation in the output response, during the settling time.

The advantages of the present solution are clear from the previous discussion.

In particular, it is again underlined that the present solution provides an efficient combined control of both propeller speed and propeller pitch angle jointly, at the same time, also allowing to limit via software the minimum pitch value at a desired MGP value, lower than the MFP value.

The proposed control solution provides an increased reliability, since the propeller speed control does not require a pitch measurement at altitude, during flight. If the pitch position measurement has a fault, the pitch control will be deactivated and the minimum pitch MFP value assured by the hydraulic lock.

Moreover, the proposed control solution provides a smooth transition, at ground operation, between the speed control (implemented by the propeller speed regulator 39) and the pitch control (implemented by the propeller pitch regulator 42), due to operation of the priority selection stage 45.

The proposed solution moreover allows to achieve an increased safety with respect to the application of feathering function.

Finally, it is clear that modifications and variations can be made to what is described and illustrated herein, without thereby departing from the scope of the present invention as defined in the appended claims.

In particular, it is underlined that, although generally applied to a fixed-wing aircraft, the present disclosure may further apply to rotary-wing aircraft, tilt-rotor aircraft, or other apparatuses including a pitch-changing propeller assembly and a gas generator coupled to the aircraft.

The invention claimed is:

1. An electronic control system for a turbopropeller engine having a gas turbine and a propeller assembly coupled to the gas turbine, the control system being configured to control propeller operation based on a pilot input request, via generation of a driving quantity for an actuation assembly designed to adjust a pitch angle of propeller blades of the propeller assembly, the electronic control system comprising:
   a propeller speed regulator configured to receive at its input a propeller speed error indicative of a difference between a propeller speed measure and a propeller speed demand, and to generate at its output, based on the propeller speed error, a first control quantity;
   a propeller pitch regulator configured to receive at its input a propeller pitch error indicative of a difference between a propeller pitch demand and a pitch position measure, and to generate at its output, based on the propeller pitch error, a second control quantity; and
   a priority selection stage coupled to the output of the propeller speed regulator and the output of the propeller pitch regulator to receive the first and the second control quantities, and configured to implement a priority selection between the first and the second control quantities, for providing at an output of the priority selection stage the driving quantity, based on the priority selection between the first and the second control quantities.

2. The system according to claim 1, wherein the electronic control system is configured to receive an input signal indicative of an angular position of an input lever determining the pilot input request; wherein the priority selection stage is configured to select the first control quantity at the output of the propeller speed regulator, when the input signal is indicative of the angular position of the input lever being in a first range, comprised between an idle position up to a full-forward position; and to select the second control quantity at the output of the propeller pitch regulator when the input signal is indicative of the angular position of the input lever being in a second range, distinct from the first range, comprised between the idle position down to a full-reverse position.

3. The system according to claim 1, wherein the priority selection stage is configured to implement a maximum selection between the first and the second control quantities, to select at the output of the priority selection stage the greater between the first and second control quantities, for providing the driving quantity.

4. The system according to claim 3, wherein a positive value of the driving quantity is designed to determine an increase of the pitch angle by the actuation assembly.

5. The system according to claim 1, wherein the electronic control system is configured to engage a mechanical lock, determining a minimum flight pitch value for the pitch angle during a flight operating mode; wherein the propeller pitch demand is equal to a minimum ground pitch value, lower than the minimum flight pitch value, when an angular position of an input lever is in a first range, comprised between an idle position up to a full-forward position.

6. The system according to claim 1, wherein the propeller pitch demand is equal to a feather position value, corresponding to a maximum pitch value, upon receiving a feather command indicative of a feathering request.

7. The system according to claim 1, further comprising:
   a first reference generator configured to receive an input signal indicative of an angular position of an input lever and to determine a value of the propeller speed demand corresponding to the input signal;
   a first adder block configured to receive at a negative input the propeller speed demand and at a positive input the propeller speed measure, and to provide at its output the propeller speed error.

8. The system according to claim 1, further comprising:
   a second reference generator configured to receive an input signal indicative of an angular position of an input lever and to determine a value of the propeller pitch demand corresponding to the input signal;
   a second adder block configured to receive at a positive input the propeller pitch demand and at a negative input the pitch position measure, and to provide at the its output the propeller pitch error.

9. The system according to claim 8, wherein the second reference generator comprises:
   a scheduler configured to receive the input signal and to determine a first reference value for the pitch angle, corresponding to the angular position of the input lever;
   a first switch selector having a first switching input coupled to the scheduler to receive the first reference value and a second switching input to receive a minimum ground pitch value, lower than a minimum flight pitch value that is determined by a hydraulic lock, and providing at its output either the first reference value or the minimum ground pitch value, as a second reference value, depending on the angular position of the input lever being lower than an idle position or, respectively, higher than the idle position;
   a second switch selector, having a respective first switching input coupled to the output of the first switch selector to receive the second reference value and a respective second switching input to receive a feather position value, corresponding to a maximum pitch value, and providing at its output either the second reference value or the feather position value, as the propeller pitch demand based on a feather command indicative of a feathering request.

10. The system according to claim 1, wherein the propeller speed regulator and the propeller pitch regulator comprise a respective lead compensator, implementing a proportional gain and a lead/lag function.

11. A turbopropeller engine for an aircraft, comprising: a gas turbine; a propeller assembly, coupled to the gas turbine via a gearbox assembly; and the electronic control system according to claim 1.

12. An aircraft comprising the turbopropeller engine according to claim 11.

13. A control method for a turbopropeller engine having a gas turbine and a propeller assembly coupled to the gas turbine, configured to control propeller operation based on a pilot input request, via generation of a driving quantity for an actuation assembly designed to adjust a pitch angle of propeller blades of the propeller assembly, wherein the control method comprises:

generating, by a propeller speed regulator, a first control quantity, based on a propeller speed error, indicative of a difference between a propeller speed measure and a propeller speed demand;

generating, by a propeller pitch regulator, a second control quantity, based on a propeller pitch error, indicative of a difference between a propeller pitch demand and a pitch position measure; and implementing a priority selection between the first and the second control quantities, for providing the driving quantity, based on the priority selection between the first and the second control quantities.

14. The method according to claim 13, further comprising:

receiving an input signal indicative of an angular position of an input lever; wherein implementing the priority selection comprises selecting the first control quantity, when the input signal is indicative of the angular position of the input lever being in a first range, comprised between an idle position up to a full-forward position; and selecting the second control quantity generated by of the propeller pitch regulator when the input signal is indicative of the angular position of the input lever being in a second range, distinct from the first range, comprised between the idle position down to a full-reverse position.

15. The method according to claim 13, wherein implementing the priority selection comprises implementing a maximum selection between the first and the second control quantities, to select the greater between the first and the second control quantities, for providing the driving quantity.

16. The method according to claim 13, further comprising:

engaging a mechanical lock determining a minimum flight pitch value for the pitch angle during a flight operating mode;

providing the propeller pitch demand equal to a minimum ground pitch value, lower than the minimum flight pitch value, when the angular position of an input lever is in a first range, comprised between an idle position up to a full-forward position; and providing the propeller pitch demand equal to a feather position value, corresponding to a maximum pitch value, upon receiving a feather command indicative of a feathering request.

* * * * *